June 2, 1925.
F. W. BULTMANN
SHORE PROTECTOR
Filed June 2, 1924
1,540,534
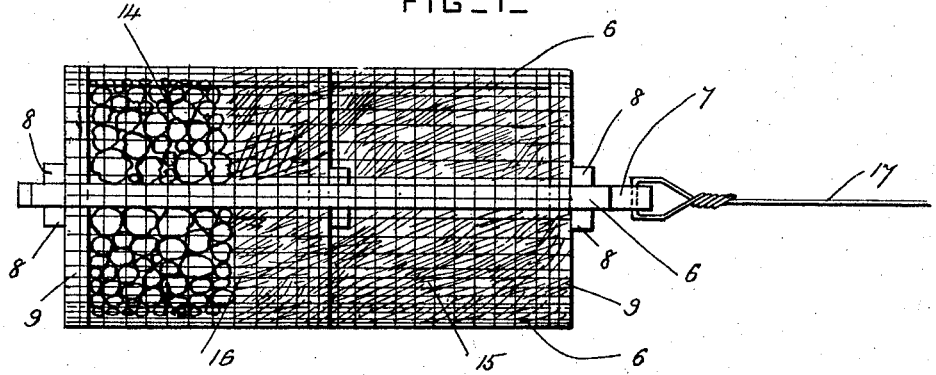
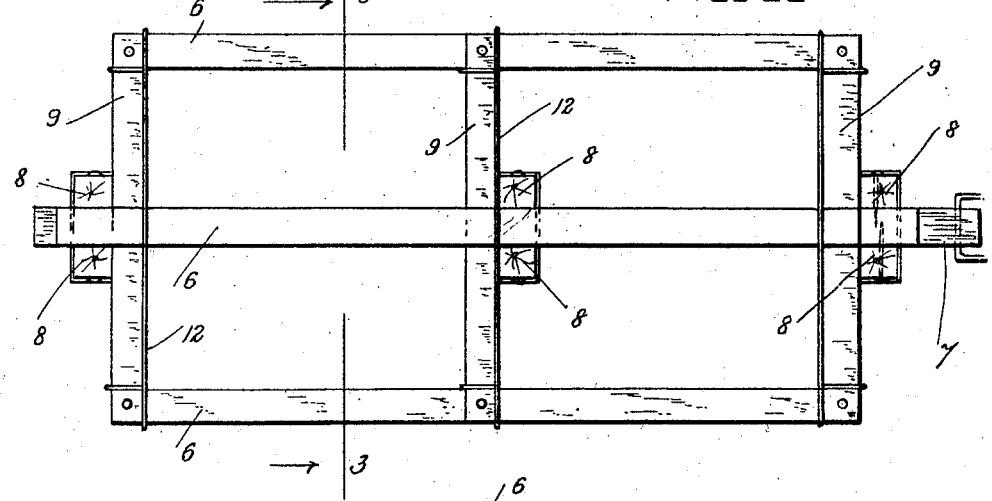
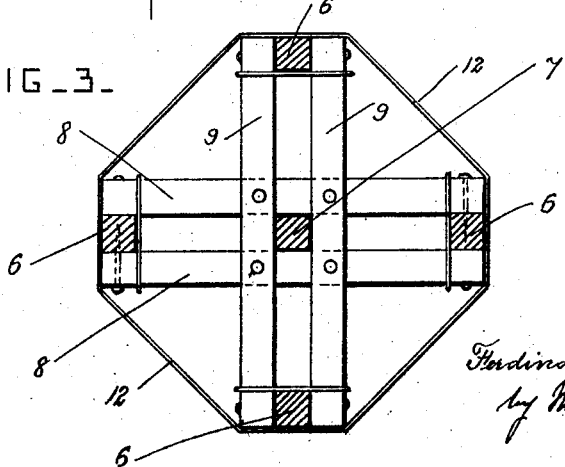
Inventor.
Ferdinand W. Bultmann
by Herbert W. Jenner.
Attorney.

Patented June 2, 1925.

1,540,534

UNITED STATES PATENT OFFICE.

FERDINAND WILLIAM BULTMANN, OF WAKENDA, MISSOURI.

SHORE PROTECTOR.

Application filed June 2, 1924. Serial No. 717,334.

*To all whom it may concern:*

Be it known that I, FERDINAND W. BULTMANN, a citizen of the United States, residing at Wakenda, in the county of Carroll and State of Missouri, have invented certain new and useful Improvements in Shore Protectors, of which the following is a specification.

This invention relates to shore protectors or fascines used on river banks and in connection with wash-outs; and it consists in the novel construction and combination of the parts hereinafter fully described and claimed.

In the drawings, Figure 1 is a side view of a shore protector constructed according to this invention. Fig. 2 is a side view of the frame of the shore protector, drawn to a larger scale. Fig. 3 is a cross-section through the frame, taken on the line 3—3 in Fig. 2.

A central longitudinal bar 7 is provided, and 6 are four longitudinal bars spaced apart from the bar 7 and arranged around it. Crossbars 8 and 9 arranged in pairs are provided. The two crossbars of each pair are arranged parallel to each other, and they straddle the central bar 7 and two of the longitudinal bars 6. The crossbars 8 of one pair are arranged crosswise of the crossbars 9 of another pair and are secured to them as shown.

All the bars are secured together by nails or other convenient fastening devices, and stays 12 of wire. The stay wires extend between the end portions of the bars around the device, and are twisted around the bars at their junctions, so as to hold all parts of the frame securely fastened together. Any sort of packing material is arranged in the frame around the central bar. Rocks 14 are preferably arranged between the members of the frame at one end portion, and straw or other similar packing material 15 is secured at its other end portion. The whole is encased in wire netting 16, such as poultry wire, which is arranged around the frame and packing in any convenient way.

A wire handle 17 is secured to one end of the central bar 7 for moving the device from place to place. Crossbars 8 and 9 are arranged at each end of the frame, and as many more as desirable at intermediate points.

These shore protectors are made of any desirable length and proportions, and their frames have the advantage of being very quickly made from rough lumber, which is very readily obtainable. They are very strong and efficient in use, and do not readily come apart. The rocks are provided to hold the devices in position.

What I claim is:

1. A shore protector or fascine, comprising a frame having a central longitudinal bar, outer longitudinal bars spaced apart from the central bar and arranged around it, and crossbars arranged in pairs which are secured crosswise of each other, the bars of each pair being arranged to straddle the central bar and two of the outer bars, and packing material arranged in the frame around the central bar.

2. A shore protector or fascine as set forth in claim 1, and having wire stays wound around the end portions of the crossbars and extending between them, and wire netting inclosing the frame and packing material and holding the packing material in place.

In testimony whereof I have affixed my signature.

FERDINAND WILLIAM BULTMANN.